(No Model.)
G. A. STINE.
SEED PLANTER.
No. 491,863. Patented Feb. 14, 1893.
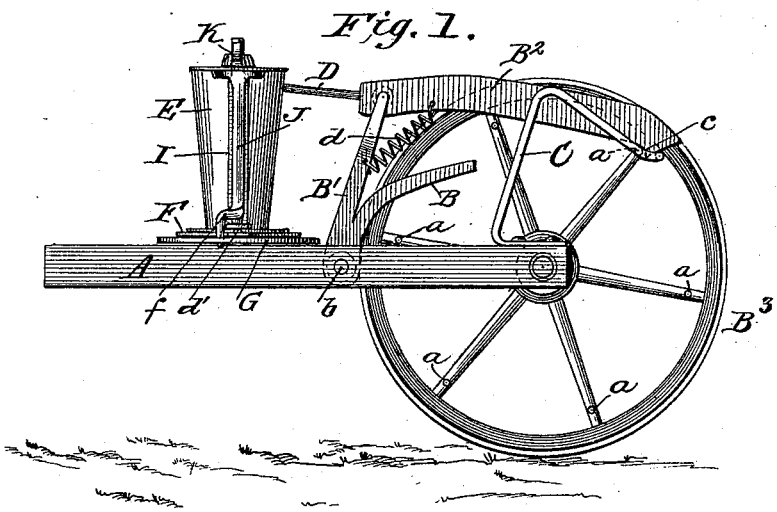
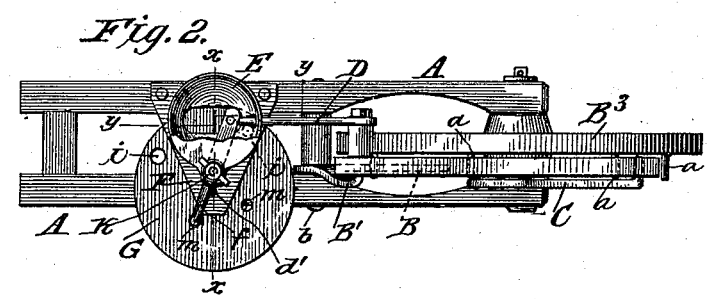
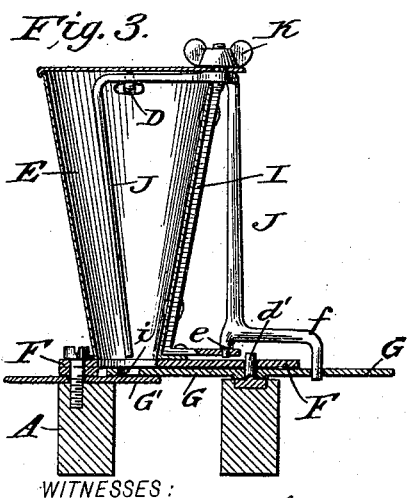
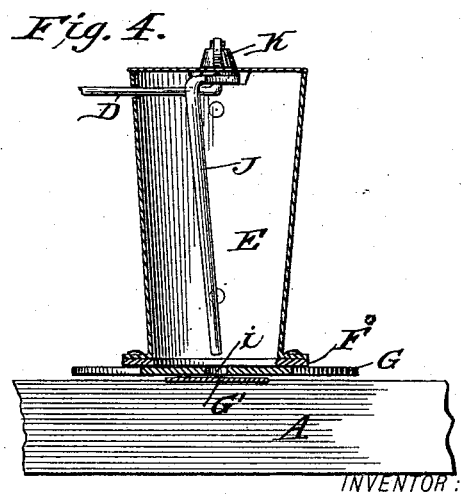
WITNESSES:
Fred G. Dieterich
Edw. W. Byrn
INVENTOR:
G. A. Stine.
BY Munn & Co.
ATTORNEYS
THE NORRIS PETERS CO., PHOTO-LITHO., WASHINGTON, D. C.

UNITED STATES PATENT OFFICE.

GEORGE A. STINE, OF SPOKANE, WASHINGTON.

SEED-PLANTER.

SPECIFICATION forming part of Letters Patent No. 491,863, dated February 14, 1893.

Application filed October 12, 1892. Serial No. 448,709. (No model.)

*To all whom it may concern:*

Be it known that I, GEORGE A. STINE, of Spokane, in the county of Spokane and State of Washington, have invented a new and useful Improvement in Seed-Planters, of which the following is a specification.

The object of my invention is to provide a seed planter which shall be adapted to plant seed in hills or rows, and in a greater or less quantity, as well as seed of different sizes, and also a variable distance apart, and to this end it consists in the peculiar construction and arrangement of parts of the device which I will now proceed to describe with reference to the drawings in which Figure 1 is a side view. Fig. 2 a plan view. Fig. 3 a vertical transverse section through the seed box on line $x-x$, and Fig. 4 a vertical longitudinal section through the seed box on line $y-y$.

In the drawings A represents the main frame, consisting of two parallel horizontal bars connected together by cross bars and having journaled between their front ends the actuating wheel $B^3$. This wheel is made as a spoked wheel with laterally projecting pins $a$ projecting at right angles to the plane of the wheel and adapted, when the wheel revolves, to operate the seeding devices. These pins are made detachable so that the alternate ones, or any number of them, may be removed to vary the distances between the points at which the seed are dropped.

B B' are two operating arms which are connected together and are pivoted upon an axial bolt $b$ in the main frame and project upwardly. One of these arms B bends inwardly toward the actuating wheel and comes within range of deflection by the pins of said wheel, and the other arm B' is pivoted at its upper end to a drag pawl $B^2$ which has a shoulder $c$ against which the pins also act. The pins acting upon one of these arms B deflect them in one direction, and then acting against the shoulder $c$ of the drag pawl pull the levers in the opposite direction. This drag pawl $B^2$ is made to yield on its pivot against the tension of a coil or other form of spring $d$ which normally holds the pawl down. When the pawl is dragged to the front, to the limit of its movement, it is lifted so that its shoulder $c$ is pulled off the pin. This lifting action is effected by an arm C rising from the main frame a little above the level of the drag pawl, and then bent forwardly and inwardly. This arm serves as a guide to hold the pawl to the wheel and also as a trip to lift the shoulder of the pawl over the pin.

From the revolution of the wheel and its pins, it will be seen that a back and forth rocking motion is given to the two arms B B'. This motion serves to operate the feed devices as follows. The axial connection of the arm B and the drag pawl is extended and to it is attached a short connecting rod D which extends through the side of a conical seed box E mounted upon a plate F on the main frame. Underneath this seed box there oscillates about a center $d'$ a circular feed plate G. To the side of the seed box there is rigidly fastened a standard I, and beside it is a rocking frame J, which has at its lower end a pivotal bearing $e$, and at its upper end has a hole that is slipped over the upper end of the standard.
On the lower end of this rocking frame is formed an arm $f$ whose end plays in a hole in the feed plate G and oscillates the latter about its center whenever the frame is rocked. The other end of this rocking frame is connected to the bar D to receive motion therefrom and then descends into the seed box to a point near the bottom of the seed box where it acts, when this frame is rocked, as a stirrer to keep the seed from clogging. The feed plate has feed holes $i$ through it of different sizes, and has corresponding holes $m$ for the arm of the rocking frame so that different sized holes may be brought under the seed box according to the kind of seed to be planted. Under the feed plate G is another plate G', and when the feed plate with its seed opening passes inside the seed box it receives its seed which are kept from falling out by the subjacent plate G', and then when the seed plate turns the charge of seed is moved side wise off the subjacent plate and deposited on the ground. The seeding devices as thus described are to be provided with handles, an opening plow for making the furrow, two closing or covering plows and a roller for packing the earth as in other seeders, but as these form no part of my invention it is not necessary to show them.

If it be desired to plant seed in drills or rows, all that is necessary is to remove the plate G' from under the feed plate and the seed then flow continuously. This plate G' is held in place by a set screw and is made detachable and adjustable.

K is a thumb nut on the end of the standard by the side of the seed box. This holds the lid of the seed box and also the rocking frame, and when removed permits the rocking frame to be lifted and adjusted to a new position in the feed plate.

Having thus described my invention, what I claim as new and desire to secure by Letters Patent is:

1. The combination with the actuating wheel having laterally projecting pins; of the rocking arms B B', the spring pressed drag pawl B² with shoulder c, the tripping and guiding arm C, and seeding mechanism connected to and operated by said devices substantially as shown and described.

2. The combination with a seed box; of a rocking frame operating about a vertical axis and having at its lower end an arm outside the box and its other end bent down inside the box to form a stirrer, an oscillating feed plate, and means for operating it substantially as shown and described.

3. The combination of the seed box with standard I, the oscillating feed plate G with different sized seed cavities, the adjustable subjacent plate G', the rocking frame J with arm f entering the feed plate and its opposite end bent down into the seed box to form a stirrer, the removable nut K, and means for operating the parts substantially as shown and described.

GEORGE A. STINE.

Witnesses:
L. L. WESTFALL,
E. A. DURFEY.